United States Patent
Kimes (10) Patent No.: US 8,491,439 B2
(45) Date of Patent: Jul. 23, 2013

(54) SELECTIVELY CONTROLLED ROCKER ONE-WAY CLUTCH

(75) Inventor: John W. Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1342 days.

(21) Appl. No.: 11/703,033

(22) Filed: Feb. 6, 2007

(65) Prior Publication Data
US 2008/0185253 A1 Aug. 7, 2008

(51) Int. Cl.
*F16D 41/16* (2006.01)
*F16H 3/44* (2006.01)

(52) U.S. Cl.
USPC ............... 475/324; 192/43.1; 192/46; 192/47

(58) Field of Classification Search
USPC .................. 192/46, 48.92, 43.1, 47; 475/323, 475/342
See application file for complete search history.

(56) References Cited

U.S. PATENT DOCUMENTS

| | | | |
|---|---|---|---|
| 259,527 A * | 6/1882 | Gibson | 192/46 |
| 709,900 A | 9/1902 | Gurney et al. | |
| 1,883,966 A | 10/1932 | F.R. Krause | |
| 2,013,765 A | 9/1935 | Richardson | |
| 2,134,405 A | 10/1938 | Hulshizer | |
| 2,323,353 A | 7/1943 | Plog | |
| 2,710,504 A | 6/1955 | Dodge | |
| 3,197,001 A | 7/1965 | Clements | |
| 3,527,327 A | 9/1970 | McCreary | |
| 3,563,354 A | 2/1971 | Sigg | |
| 3,954,028 A * | 5/1976 | Windish | 475/328 |
| 3,997,041 A | 12/1976 | Judd | |
| 4,141,220 A * | 2/1979 | Feucht | 60/698 |
| 4,363,390 A | 12/1982 | Eisend et al. | |
| 4,709,619 A * | 12/1987 | Bartholomaus et al. | 92/130 D |
| 5,014,667 A * | 5/1991 | Meyer | 123/360 |
| 5,064,037 A | 11/1991 | Long, Jr. | |
| 5,070,978 A | 12/1991 | Pires | |
| 5,143,189 A | 9/1992 | Meier-Burkamp | |
| 5,152,726 A * | 10/1992 | Lederman | 475/324 |
| 5,853,073 A | 12/1998 | Costin | |
| 5,927,455 A * | 7/1999 | Baker et al. | 192/36 |
| 5,947,245 A | 9/1999 | Costin et al. | |
| 5,954,174 A | 9/1999 | Costin | |
| 5,957,802 A * | 9/1999 | Yoo | 475/294 |
| 5,971,122 A | 10/1999 | Costin et al. | |

(Continued)

FOREIGN PATENT DOCUMENTS

| | | |
|---|---|---|
| DE | 19837005 A1 | 8/1999 |
| FR | 548490 | 1/1923 |
| GB | 2116 | 0/1907 |

*Primary Examiner* — David D Le
*Assistant Examiner* — Terry Chau
(74) *Attorney, Agent, or Firm* — James Dottavio; MacMillian, Sobanski & Todd, LLC (57) ABSTRACT

An overrunning clutch assembly includes a first ring having pockets spaced mutually about an axis, rockers each located in a pocket, springs each urging a rocker to pivot in a respective pocket, and first notches arranged around the axis. A second ring includes second pockets spaced mutually about the axis, second rockers each located in a second pocket such that at least one second rocker is engageable with a notch, second springs each urging a second rocker toward engagement with a notch, and second notches around the axis, at least one rocker being engageable with at least one second notch. A control member moves about the axis alternately to prevent the first rockers from engaging the second notches and to permit the first rockers to engage the second notches.

19 Claims, 5 Drawing Sheets

U.S. PATENT DOCUMENTS

| | | |
|---|---|---|
| 6,062,362 A | 5/2000 | Costin et al. |
| 6,109,410 A | 8/2000 | Costin |
| 6,290,044 B1 * | 9/2001 | Burgman et al. ............... 192/46 |
| 6,575,275 B2 | 6/2003 | Shirataki et al. |
| 6,679,364 B2 | 1/2004 | Muramatsu et al. |
| 6,739,440 B1 | 5/2004 | Dick |
| 6,814,201 B2 * | 11/2004 | Thomas ....................... 192/43.1 |
| 7,258,214 B2 * | 8/2007 | Pawley et al. ............... 192/43.1 |
| 7,484,605 B2 * | 2/2009 | Pawley et al. ............... 192/43.1 |
| 7,699,746 B2 * | 4/2010 | Maguire et al. ............... 475/324 |
| 2002/0056602 A1 | 5/2002 | Aurora |
| 2002/0112933 A1 | 8/2002 | Yamamoto et al. |
| 2002/0148697 A1 | 10/2002 | Muramatsu et al. |
| 2004/0016616 A1 * | 1/2004 | Stefina ........................... 192/46 |
| 2004/0238306 A1 * | 12/2004 | Reed et al. .................... 192/43.1 |
| 2005/0130789 A1 * | 6/2005 | Samie et al. .................. 475/284 |
| 2006/0025279 A1 * | 2/2006 | Kimes et al. .................. 475/324 |
| 2006/0185957 A1 * | 8/2006 | Kimes et al. .................... 192/46 |
| 2006/0278487 A1 | 12/2006 | Pawley et al. |
| 2008/0169166 A1 * | 7/2008 | Wittkopp et al. ............... 192/46 |

* cited by examiner

FIG. 5 ary controlled rocker one-way clutch

BACKGROUND OF THE INVENTION

1. Field of the Invention

This invention relates generally to a clutch that produces a drive connection between components when their relative rotation is in one direction, and overruns when relative rotation is in the opposite direction. In particular, the invention pertains to such a one-way or overrunning clutch having rockers, which engage and disengage in response to selectable actuation.

2. Description of the Prior Art

Conventional one-way clutches for producing a one-way drive connection between inner and outer races of the clutch include sprags or rollers for driveably connecting the races and the components of a mechanical assembly connected to the races. Such clutches are commonly used in the powertrain or driveline of an automotive vehicle. One-way clutches perform satisfactorily in many cases, but certain applications, such as those in which large magnitudes of torque are transmitted by the clutch, or those that provide only a small space for the clutch, require one-way clutches other than conventional sprag-type or roller-type clutch to meet desire requirements.

Conventional one-way clutch assemblies have at least one sprag or roller, which driveably locks two notched or pocketed races together mutually in one rotary direction and allows the races to rotate freely in the other direction. Rocker and sprag type one-way clutch assemblies can increase the torque capacity for a given package size compared to those of a roller-type clutch, but they are generally limited in torque transmitting capacity by the magnitude of the contact or bearing stresses caused by contact of the rockers or sprags with the races.

To overcome these and other difficulties, a one-way overrunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an importance factor in the design.

U.S. Pat. No. 5,954,174 discloses a ratchet one-way clutch assembly having an inner race with notches, an outer race with pockets, and rockers located in the pockets to engage the notches. The rockers have a pivot ridge which mates with a peak or recess in the pockets in the outer race to position the rocker in the pocket. The center of mass of each rocker is located such that the rocker tends to engage or disengage a notch in the inner race. A spring is used to provide a tilting force on each rocker directed to produce engagement of the rocker with a notch.

Conventional one-way clutches develop relatively large magnitudes of hoop stress in the races when torque is transmitted through the clutch; therefore, the races of conventional one-way clutches are formed of bearing grade steel in order to withstand the operating hoop stress. Because the clutches disclosed in the '978 and '174 patents develop relative low operating hoop stresses in service, those clutch can be formed of sintered powder metal. Clutches formed from powder metal potentially can be produced at relative low cost compared to the cost to form and produce a conventional clutch of high grade steel, provided extensive machining is avoided.

The clutches described in the '978 or '245 patents, however, require a significant amount of machining of the components that are formed of powder metal. Excessive internal backlash, which can produce noise at unacceptable levels, is a potentially problem under certain operating conditions with these clutches.

In an automatic transmission for a motor vehicle, hydraulically-actuated friction clutches and brakes engage and disengage to produce a range of speed ratios, which accelerate the vehicle from rest with relative high torque and low vehicle speed and thereafter maintain the vehicle at highway speed, a lower torque condition. Often the transmission contains a low-reverse brake, which alternately holds a planet carrier against rotation during operation in the first forward gear and reverse gear, and release the carrier to rotate in all other gears. A one-way clutch could produce the function of a hydraulically-actuated low-reverse brake at lower cost and with less complexity, such as by producing non-synchronous gear changes between first gear and second gear and between first gear and reverse gear, but a one-way should be selectably actuated to perform these functions.

A need exists, therefore, for a low cost, reliable one-way clutch that is be formed readily from powder metal and can be controlled to produce the range of operations required in response to selectable, coordinated actuation with other transmission functions. The clutch should occupy little space, minimize in-service noise, and require little or no machining. Preferably, the desired clutch should include features that facilitate its assembly in a drive system.

SUMMARY OF THE INVENTION

An overrunning clutch assembly includes a first ring having pockets spaced mutually about an axis, rockers each located in a pocket, springs each urging a rocker to pivot in a respective pocket, and first notches arranged around the axis. A second ring includes second pockets spaced mutually about the axis, second rockers each located in a second pocket such that at least one second rocker is engageable with a notch, second springs each urging a second rocker toward engagement with a notch, and second notches around the axis, at least one rocker being engageable with at least one second notch. A control member moves about the axis alternately to prevent the first rockers from engaging the second notches and to permit the first rockers to engage the second notches.

The shape of a pocket plate, which contains the rockers, requires no secondary machining operations for any purpose, such as to eliminate densifiers and de-densifiers in the powder metal components. The components of the clutch that are formed from powder metal require no machining after they are formed.

The number of notches for a given diameter is greater than other one-way clutches, thereby significantly reducing backlash. The design lends itself to easy assembly due to its configuration.

An overrunning or one-way clutch according to this invention includes a ring or plate formed with notches, a rocker plate formed with pockets mutually spaced angularly about an axis, each pocket including an open axial end, and a surface that closes each pocket at an end opposite the open axial end of each pocket. A rocker is located in a respective pocket for movement toward and away from engagement with a notch on the cam plate. Springs are supported on the rocker plate, each spring urging a rocker toward engagement with a notch.

Each pocket is closed at one axial end to provide structural continuity, stiffness and strength to carry forces resulting from engagement of the rockers with the notches when the clutch is engaged.

An actuator, secured to control elements, actuating the control elements to control movement of the rockers. A summing device secured to the actuator can apply a first force representing a first status condition and a second force representing a second status condition. The actuator activates the control elements to prevent engagement of the rockers with the second notches when the first and second forces are concurrently applied to the summing device.

Various objects and advantages of this invention will become apparent to those skilled in the art from the following detailed description of the preferred embodiment, when read in light of the accompanying drawings.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
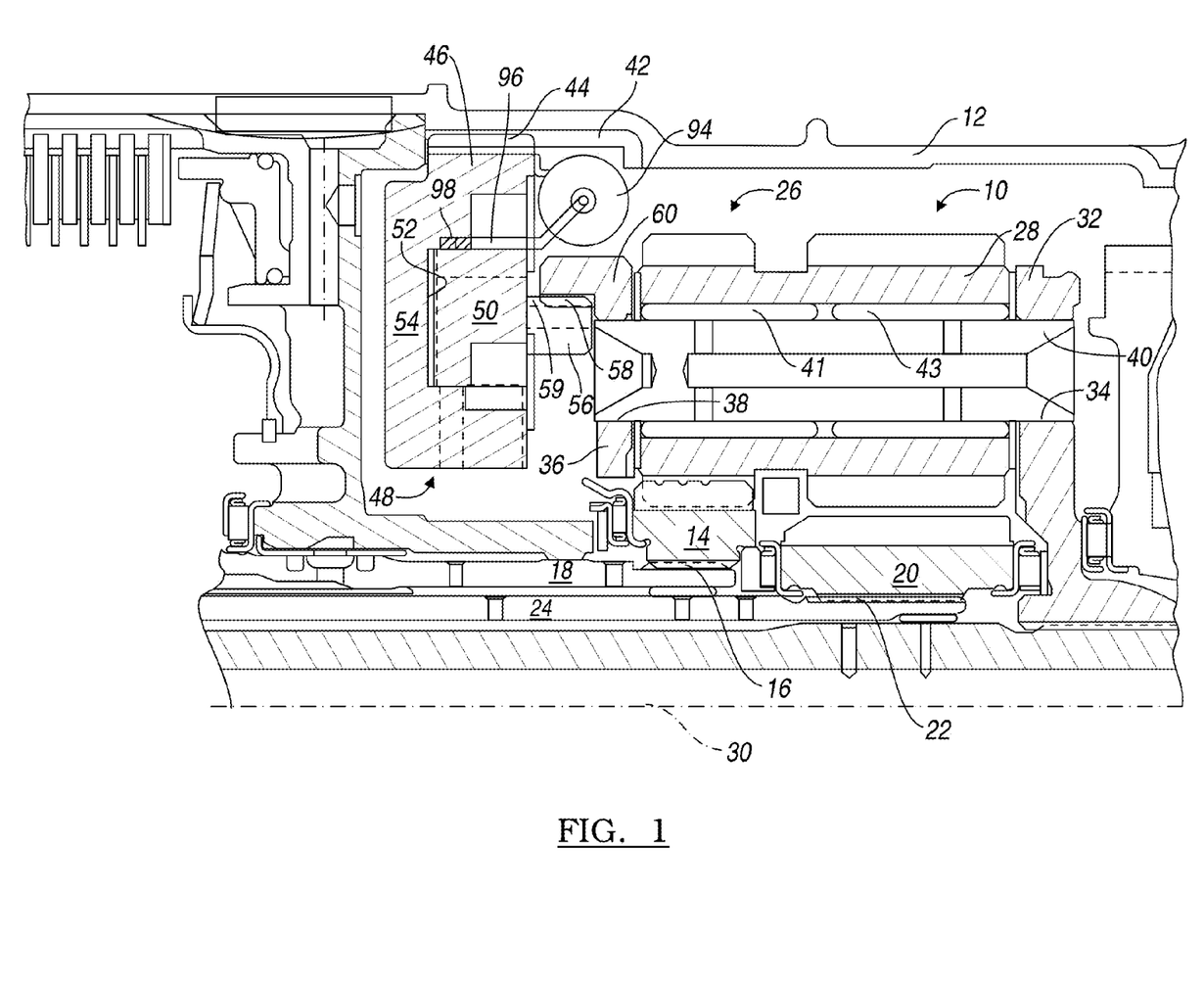
FIG. 1 is a side cross section of a Ravigneaux gear set for an automatic transmission.
Figure 2:
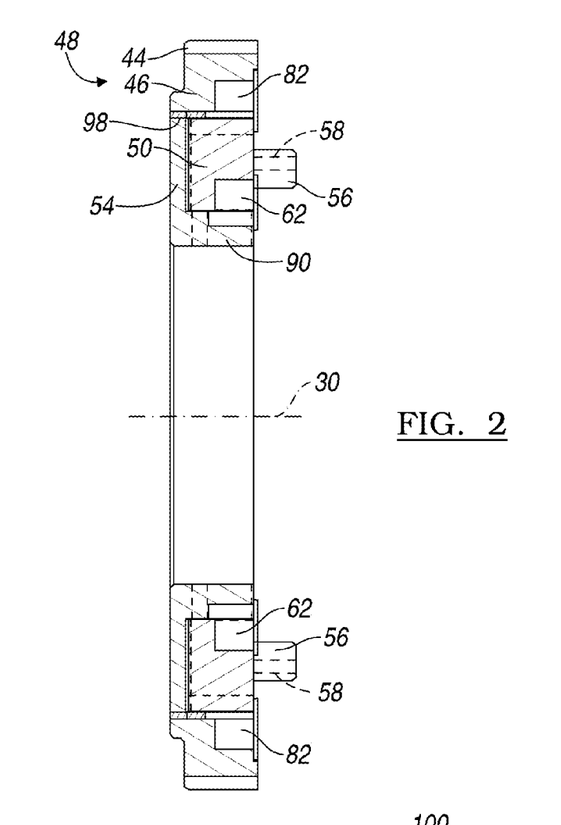
FIG. 2 is side view of the one-way clutch shown in FIG. 1.

Referring to FIG. 1, a planetary gear assembly 10 of the Ravigneaux type located in a transmission case 12 includes a first sun gear 14, connected by a spline 16 to a rotating shaft 18; a second sun gear 20, connected by a spline 22 to a rotating shaft 24; a planet pinion carrier assembly 26, which is supported for rotation and includes long planet pinions 28, each spaced angularly about a longitudinal axis 30, supported on the carrier 26 and meshing with sun gear 14. The gear assembly 10 includes a set of short planet pinions (not shown), each spaced angularly about axis 30, supported on carrier 26 and meshing with sun gear 20 and a long pinion 28. The gear assembly 10 further includes a ring gear (not shown) surrounding the long pinions 28, short pinions and sun gears 14, 20 and engaged with the long pinions 28.

The carrier assembly 26 includes a first disc 32 formed with axial holes 34; a second disc 36 spaced axially from the first disc and formed with axial holes 38, each second hole being aligned a first hole; and pinion shafts 40 each supported on the carrier 26 and extending axially through a first hole 34 and a second hole 38. Bearings 41, 43, fitted between the outer surface of a respective pinion shaft 40 and the inner surface of a corresponding long pinion 28, support the long pinions 28 in rotation on the pinion shafts 40.

The transmission case 12 is formed at an inner surface with axial spline teeth 42, which are engaged with external spline teeth 44 formed on the circumferential periphery of a ring 46 of a rocker one-way clutch 48. An inner ring 50 of clutch 48 is received in an annular recess 52, which is closed axially by the radial wall 54 of clutch ring 50. The inner ring 50 of clutch 48 includes a connector ring 56, which extends axially and is formed at its radial outer periphery with axial external spline teeth 58. The adjacent carrier disc 36 includes a disc 60, which extends axially toward clutch 48 and is formed at its radial inner periphery with axial internal spline teeth 58, which engage the spline teeth 59 of the inner clutch ring 50. In this way, carrier 26 is continually operably connected to the inner ring 50 of clutch 48.

Figure 3:
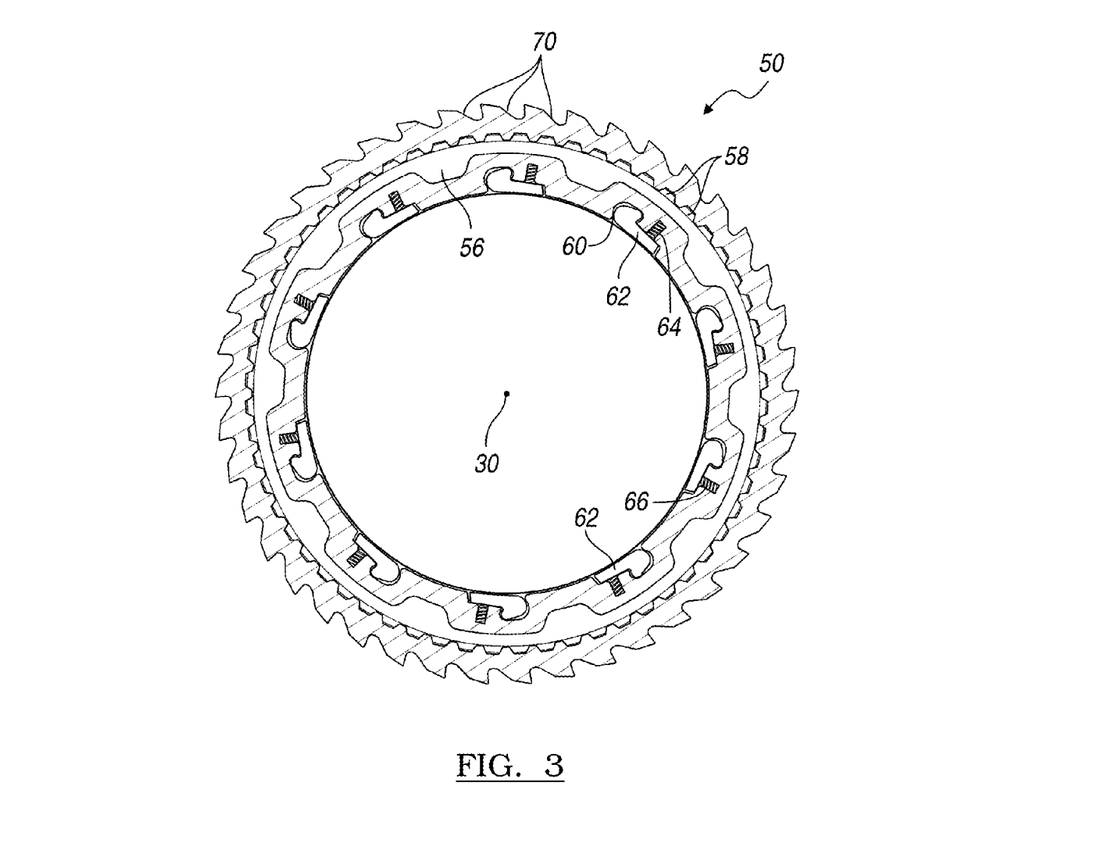
FIG. 3 is an end view of the inner ring of the one-way clutch.

Turning now to FIG. 3, the inner ring 50 of clutch 48 includes a series of pockets located at the radial inner periphery and angularly spaced about axis 30, a series of inner rockers 62 each located in a respective pocket, spring recesses 64 located at each pocket, and compression springs 66, each located in a spring recess 64 and urging the respective rocker to pivot radially inward toward axis 30 toward engagement with any one of the notches 68 formed on clutch ring 46. The radial outer periphery of inner ring 50 is formed with a series of the notches 70.

Figure 4:
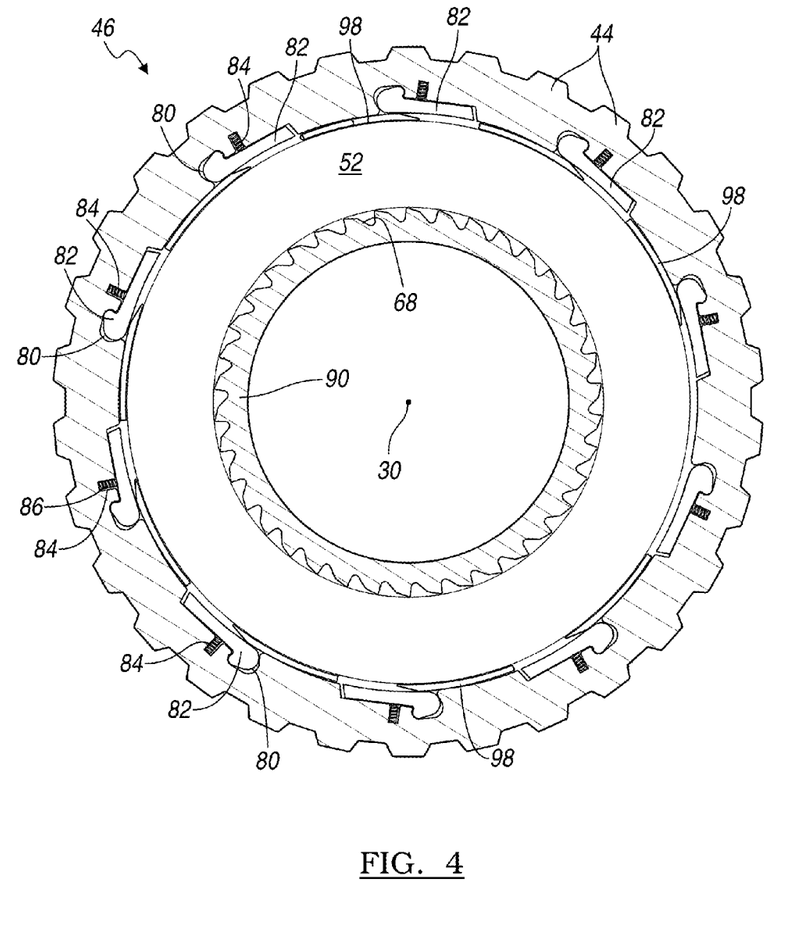
FIG. 4 is an end view of the other ring of the one-way clutch.
Figure 5:
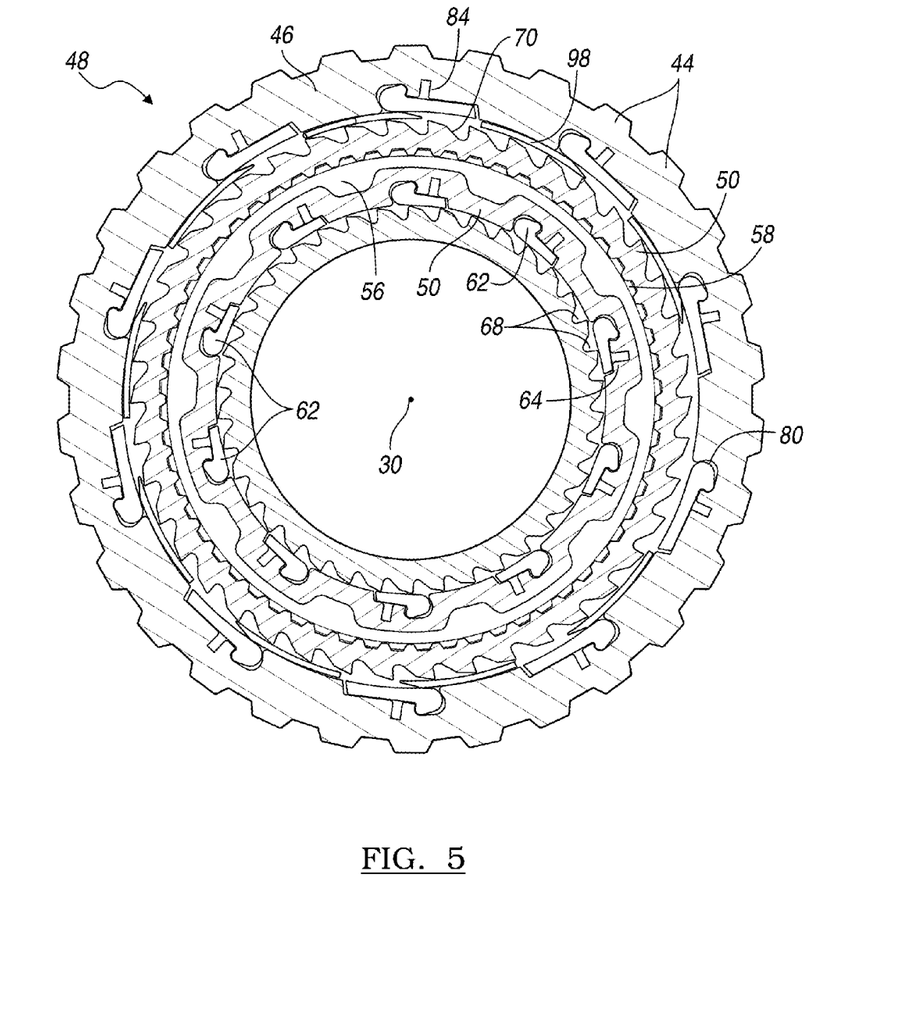
FIG. 5 is an end view showing the inner ring and actuator installed in the other ring of the one-way clutch.

FIG. 4 illustrates that outer clutch ring 46 includes a series of pockets 80 angularly spaced about axis 30 and located at a radial inner periphery adjacent the annular recess 52, which contains the inner ring 50 when the clutch is assembles as shown in FIG. 5. Ring 46 further includes a series of outer rockers 82 each located in a respective pocket 80, spring recesses 84 located at each pocket 80, and compression springs 86, each located in a spring recess 84 and urging the respective rocker 82 to pivot radially inward toward axis 30 toward engagement with any one of the notches 70 formed on inner clutch ring 50. The radial outer periphery of a ring 90 of inner ring 50 is formed with the series of notches 68, which are engaged by rockers 62 of the inner ring 50.

FIGS. 1, 2, 4 and 6 show that clutch 46 is controlled by an actuator 94, such as an electric solenoid and/or a hydraulic valve. An arm 96 extending from the actuator 94 carries a series of control elements or blades 98, each blade being angularly spaced mutually about axis 30 and located radially between the notches 70 on the radial outer periphery of inner clutch ring 50 and the radial inner periphery of clutch ring 46. Actuator 94 moves the arm 96 perpendicular to axis 30 and the blades 98 angularly about axis 30.

When actuator 94 moves blades 98 counterclockwise a short angular distance from their position in FIGS. 4 and 5, the blades allow the rockers to pivot toward inner ring 50, and springs 86 cause rockers 82 to pivot clockwise bringing at least one rocker 82 into engagement with at least one of the notches 70 on the inner ring 50, thereby holding carrier 26 against rotation on the transmission case 12 through the load path that includes carrier disc 36, engaged splines 58, 59, connector ring 56 of inner clutch ring 50, engaged notches 70 and rockers 82, ring 46, and engaged splines 44, 42.

When actuator 94 moves blades 98 clockwise from their position in FIGS. 4 and 5 to cover pockets 80 on clutch ring 46, the blades cause the rockers 82 to pivot counterclockwise into the pockets 80 and prevent rockers 82 from pivoting into engagement with any of the notches 70 on the inner ring 50. This action permits carrier 26 to rotate freely about axis 30 unless at least one of the inner rockers 62 on inner clutch ring 50 engages a notch 68 on clutch ring 46. Actuator 94 operates in response to a command signal from a control system alternately to hold carrier 26 against rotation or to release carrier 26 to rotate subject to engagement of rockers 62 with notches 68.

When actuator 94 causes blades 98 to cover pockets 80 on clutch ring 46, and at least one of the inner rockers 62 on inner clutch ring 50 engages a notch 68 on clutch ring 46, carrier 26 is held against rotation on the transmission case 12 through the load path that includes carrier disc 36, engaged splines 58, 59, inner clutch ring 50, engaged notches 68 and rockers 62, clutch ring 46, and engaged splines 44, 42.

Figure 6:
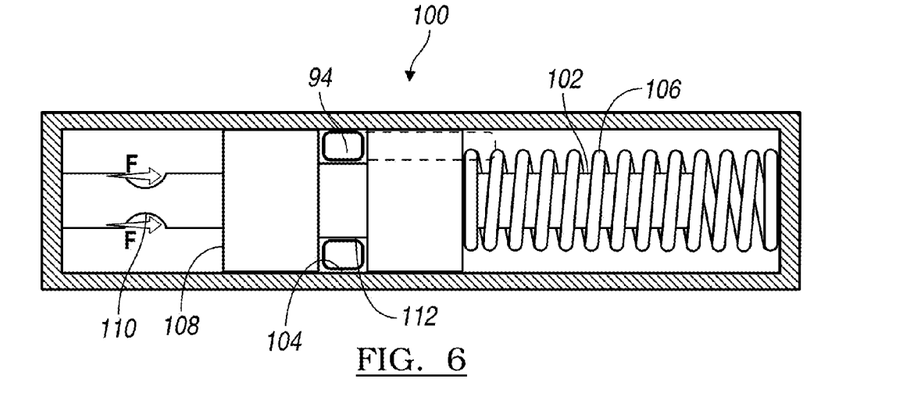
FIG. 6 illustrates an electro-hydraulic control device 100 for activating the clutch actuator.

Preferably, actuator 94 actuates the blades 98 to hold and release carrier 26 in combination with a device 100 controlled by logic of a control algorithm that ensure correct operation of clutch 48. FIG. 6 illustrates an electro-hydraulic device 100 for this purpose. A valve spool 102 moves in a chamber 104 subject to several forces, which include the force of a compression spring 106, a hydraulic force applied to control land 108 in opposition to spring 106 in response to control logic, and a force F of a solenoid 110, which is actuated by a microprocessor in response to control logic. Actuator 94 is fitted in a recess 112 on valve spool 102. When hydraulic pressure is applied to land 108 alone or the solenoid force F is applied alone, valve 102 remains at the left hand end of chamber 104 and actuator 94 is not activated because the spring force is greater than force F or the hydraulic pressure force. Actuator 94 causes blades 98 to cover rockers 82 only when both the solenoid force F and the hydraulic pressure force are applied concurrently.

In accordance with the provisions of the patent statutes, the preferred embodiment has been described. However, it should be noted that the alternate embodiments can be practiced otherwise than as specifically illustrated and described.

What is claimed is:

1. An overrunning clutch assembly, comprising:
a first ring including first pockets spaced mutually about an axis; first rockers, each first rocker located in a first pocket; first springs, each first spring urging a first rocker to pivot in a respective first pocket; and first notches;
a second ring including second pockets; second rockers, each second rocker located in a second pocket, at least one second rocker being engageable with a first notch; second springs, each second spring urging a second rocker toward engagement with a first notch; and second notches, at least one first rocker being engageable with at least one second notch.

2. An overrunning clutch assembly, comprising:
a first ring including first pockets spaced mutually about an axis; first rockers, each first rocker located in a first pocket; first springs, each first spring urging a first rocker to pivot in a respective first pocket; and first notches;
a second ring including second pockets; second rockers, each second rocker located in a second pocket, at least one second rocker being engageable with a first notch; second springs, each second spring urging a second rocker toward engagement with a first notch; and second notches, at least one first rocker being engageable with at least one second notch; and
a control member whose movement in a first direction permits at least one first rocker to engage a second notch and requires concurrent presence of first and second coaxial forces whose sum exceeds and opposes a third force, and whose movement in a second direction preventing said engagement requires absence of at least one of said first and second forces.

3. The clutch of claim 2, wherein:
the first ring further comprises an annular recess surrounding the axis and located radially between the first notches and first rockers, the second ring being located in the recess.

4. The clutch of claim 2, wherein:
the first ring further comprises an annular recess surrounding the axis and located radially between the first notches and first rockers, the second ring being located in the recess such that the first rockers face the second notches, and the second rockers face and are adjacent the first notches.

5. The clutch of claim 2, wherein the second ring further includes a connector ring that extends from a surface of the second ring, and spline teeth formed on the connector ring and spaced mutually about the axis.

6. The clutch of claim 2, wherein:
the first ring further includes first spring recesses, each first spring recess containing a first spring and including a closed end and an open end located opposite the closed end and communicating with a first pocket; and
the second ring further includes second spring recesses, each second spring recess containing a second spring and including a closed end and an open end located opposite the closed end and communicating with a second pocket.

7. The clutch of claim 2, further comprising:
an actuator having potentially applied thereto the first and second forces, for actuating the control member to prevent engagement of one of the first rockers with one of the second notches when one of the forces is absent.

8. The clutch of claim 2, further comprising:
an actuator having potentially applied thereto the first and second forces, for actuating the control member to permit engagement of one of the first rockers with one of the second notches when the first and second forces are concurrently applied.

9. The clutch of claim 2, further comprising:
a chamber;
a valve spool located in the chamber and connected to the control member;
a spring urging the spool in the second direction within the chamber;
a first source producing on the valve spool the first force directed opposite the spring force; and
a second source producing on the valve spool the second force directed opposite the spring force, such that a sum of the first force and second force is greater than the spring force.

10. The clutch of claim 9, wherein the first force is produced by hydraulic pressure in the chamber and the second force is produced by an electrically actuated solenoid.

11. A clutch control assembly for an automatic transmission, comprising:
a case secured against rotation;
a pinion carrier located in the case and supported for rotation;
an overrunning clutch located in the case and including
a first ring secured to the case and including first pockets spaced mutually about an axis;
first rockers, each first rocker located in a first pocket; first springs, each first spring urging a first rocker to pivot in a respective first pocket; and first notches;

a second ring secure to the carrier and including second pockets; second rockers, each second rocker located in a second pocket, at least one second rocker being engageable with a first notch; second springs, each second spring urging a second rocker toward engagement with a first notch; and second notches around the axis, at least one first rocker being engageable with at least one second notch; and a control member whose movement in a first direction permits at least one first rocker to engage a second notch and requires concurrent presence of first and second coaxial forces whose sum exceeds and opposes a third force, and whose movement in a second direction preventing said engagement requires absence of at least one of said first and second forces.

12. The assembly of claim 11, wherein:
the first ring further comprises an annular recess surrounding the axis and located radially between the first notches and first rockers, the second ring being located in the recess.

13. The assembly of claim 11, wherein:
the first ring further comprises an annular recess surrounding the axis and located radially between the first notches and first rockers, the second ring being located in the recess such that the first rockers face the second notches, and the second rockers face and are adjacent the first notches.

14. The assembly of claim 11, wherein:
the carrier includes first spline teeth;
the second ring further includes second spline teeth engaged with the first spline teeth.

15. The assembly of claim 11, wherein:
the first ring further includes first spring recesses, each first spring recess containing a first spring and including a closed end and an open end located opposite the closed end and communicating with a first pocket; and the second ring further includes second spring recesses, each second spring recess containing a second spring and including a closed end and an open end located opposite the closed end and communicating with a second pocket.

16. The assembly of claim 11, further comprising:
an actuator having potentially applied thereto the first and second forces, for actuating the control member to prevent engagement of one of the first rockers with one of the second notches when one of the forces is absent.

17. The assembly of claim 11, further comprising:
an actuator having potentially applied thereto the first and second forces, for actuating the control member to permit engagement of one of the first rockers with one of the second notches when the first and second forces are concurrently applied.

18. The assembly of claim 11, further comprising:
a chamber;
a valve spool located in the chamber and connected to the control member;
a spring urging the spool in the second direction within the chamber;
a first source producing on the valve spool the first force directed opposite the spring force; and
a second source producing on the valve spool the second force directed opposite the spring force, such that a sum of the first force and second force is greater than the spring force.

19. The assembly of claim 18, wherein the first force is produced by hydraulic pressure in the chamber and the second force is produced by an electrically actuated solenoid.

* * * * *